United States Patent
Probin et al.

(10) Patent No.: US 9,614,860 B2
(45) Date of Patent: Apr. 4, 2017

(54) EQUIPMENT AND NETWORK HEALTH MONITORING USING SECURITY SYSTEMS

(71) Applicant: Honeywell International Inc., Morristown, NJ (US)

(72) Inventors: Robert John Probin, Glasgow (GB); Martin Leonard Crisp, Motherwell (GB)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 0 days.

(21) Appl. No.: 14/575,402

(22) Filed: Dec. 18, 2014

(65) Prior Publication Data

US 2016/0182535 A1   Jun. 23, 2016

(51) Int. Cl.
*G06F 21/55* (2013.01)
*H04L 29/06* (2006.01)
*H04L 12/26* (2006.01)

(52) U.S. Cl.
CPC ........ *H04L 63/1408* (2013.01); *G06F 21/552* (2013.01); *H04L 43/0805* (2013.01); *H04L 43/0817* (2013.01); *H04L 43/0894* (2013.01); *H04L 43/10* (2013.01)

(58) Field of Classification Search
CPC .... G06F 21/552; H04L 43/0817; H04L 43/10
See application file for complete search history.

(56) References Cited

U.S. PATENT DOCUMENTS

| 6,349,335 | B1 | 2/2002 | Jenney | |
|---|---|---|---|---|
| 6,456,306 | B1* | 9/2002 | Chin | H04L 41/0213 709/224 |
| 6,502,132 | B1 | 12/2002 | Kumano et al. | |
| 2002/0069275 | A1* | 6/2002 | Tindal | H04L 41/0226 709/223 |
| 2002/0108058 | A1* | 8/2002 | Iwamura | G06F 21/88 726/35 |
| 2003/0177222 | A1* | 9/2003 | Bradley | H04L 43/0817 709/224 |
| 2007/0233858 | A1* | 10/2007 | Goff | H04L 12/2602 709/224 |
| 2008/0155327 | A1* | 6/2008 | Black | H04L 41/5012 714/27 |
| 2010/0238814 | A1* | 9/2010 | Chen | H04L 41/0681 370/252 |

(Continued)

FOREIGN PATENT DOCUMENTS

EP    1 650 972 A1    4/2006

OTHER PUBLICATIONS

Turon, "Mote-View: a sensor network monitoring and management tool", 2005, pp. 11-18.*

(Continued)

*Primary Examiner* — Thanhnga B Truong
*Assistant Examiner* — Thaddeus Plecha
(74) *Attorney, Agent, or Firm* — Husch Blackwell LLP

(57) ABSTRACT

A monitoring system is continuously coupled to and in communication with a selected network. The system monitors characteristics of the network and characteristics of assets of the network. Removal of assets can be detected and alarm indicating messages can be generated locally at the monitoring system or at a wireless communication device.

13 Claims, 1 Drawing Sheet

(56) References Cited

U.S. PATENT DOCUMENTS

2013/0151692 A1* 6/2013 White .................. H04L 41/145
709/224
2016/0048573 A1* 2/2016 Muttik .............. G06F 17/30598
707/737

OTHER PUBLICATIONS

Extended European search report for corresponding EP patent application 15199436.5, dated Apr. 18, 2016.
Anonymous, "Network monitoring—From Wikipedia, the free encyclopedia", https://en.wikipedia.org/w/index.php?title=Network_monitoring&oldid=628606084, revision Oct. 7, 2014.
Examination report for corresponding EP patent application 15199436.5, dated Jan. 30, 2017.

\* cited by examiner

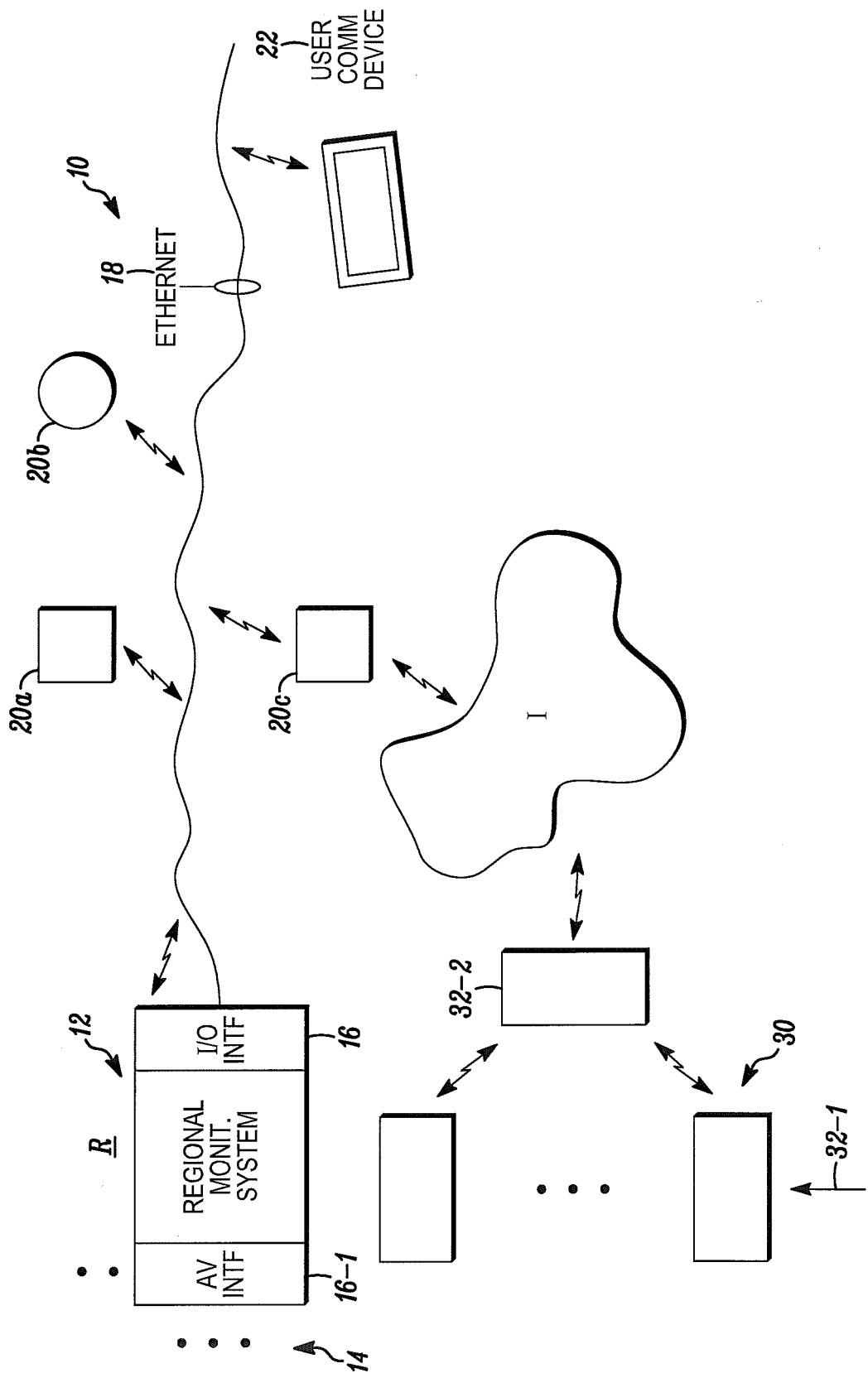

EQUIPMENT AND NETWORK HEALTH MONITORING USING SECURITY SYSTEMS

FIELD

The application pertains to monitoring various aspects of devices or equipment coupled to networks and monitoring the networks. More particularly, the application pertains to such systems and methods that utilize a monitoring system coupled to the network to monitor the presence and condition of network connected assets. The condition of the network itself can also be monitored.

BACKGROUND

The security (tracking) of assets (e.g., printers, PCs, servers, site specific electronic devices, 'embedded' electronic equipment, and other items) in a system using a security system is traditionally implemented by detecting physical movement of a device beyond a predefined threshold.

However, this approach has problems: each device requires a connected physical sensor. This leads to additional material and installation and maintenance costs for the end user. If the asset tracking devices use RF communications, then the management of the batteries could be perceived as an issue.

Additionally, the health of the network and the network connected devices is currently considered outside the scope of a standard intrusion detection security system.

BRIEF DESCRIPTION OF THE DRAWINGS

FIG. 1 illustrates a block diagram of a system in accordance herewith.

DETAILED DESCRIPTION

While disclosed embodiments can take many different forms, specific embodiments thereof are shown in the drawings and will be described herein in detail with the understanding that the present disclosure is to be considered as an exemplification of the principles thereof as well as the best mode of practicing the same and is not intended to limit the application or claims to the specific embodiment illustrated.

In one aspect, if the security system has a permanent Ethernet connection that is always on, then it is possible to use this as an alternate method for detecting removal of an Ethernet connected asset. Removal alarms can be generated.

An additional problem could be solved with an embodiment that combines an alarm system with a permanent Ethernet connection. This configuration provides a platform to monitor the network, provide information on characteristics like device and bandwidth availability, and provide alerts based on preset local parameters. This device and network "health" information can relate to available bandwidth (either internal or external) and other characteristics that the system and connected devices can provide.

For example, if a network printer is not responding to network pings whilst that area/partition of the security system is not armed, then the security system can notify (via email, web form submission, SMS text, voice message, or another method) the appropriate person, perhaps locally. If the system is armed, then a different set of individuals can be notified, for example, monitoring individuals at an alarm receiving center so they can decide on the best course of action.

In another example, the security system could keep a log of Internet availability and transmit a signal via alternate communication paths if outages occur.

Using the permanently connected Ethernet connection, the alarm system control panel can provide various functions not previously available with monitoring systems. For example, it can monitor devices that are connected to the same network. The alarm system user can be provided with a list of devices connected to the network. The end user can select these devices from the list.

If a device is disconnected from the network for a predefined amount of time, then the system can trigger an alert. In yet another aspect, when a permanently connected Ethernet line is in place, the alarm system can provide additional functionality. For example, constant (i.e., 24/7) monitoring of the network is possible. Available bandwidth can be monitored and logged (possibly on a central server). Such real-time information can be used to provide information on the "health" of the network. This capability is not normally a feature of an alarm system. Also, future faults can be predicted. For example, if the available bandwidth decreases gradually over time, then an alarm indication can be generated. In yet another aspect, data and potential debug information can be provided after a network fault.

Information can be collected and provided on the 'health' of devices on the network. This function provides additional features in an alarm system. Finally, more complex checks can be implemented on specific devices using an installer or IT manager configuration interface.

FIG. 1 illustrates a system or apparatus 10 in accordance herewith. In the embodiment of FIG. 1, a regional monitoring system 12 monitors conditions in a region R via a plurality of sensors or detectors 14. Those of skill will understand that members of the plurality 14 can include motion detectors, glass break detectors, smoke detectors, and thermal detectors without limitation. None of the physical characteristics of any such sensors or detectors are limitations hereof.

The system 12 can communicate via an interface 16 and the Ethernet 18 as would be understood by those of skill in the art. Communications of the system 12 via the interface 16 to the Ethernet 18 are available on a 24×7 basis. This can be characterized as an "always on" communications environment.

Other network enabled devices, such as 20a, 20b, 20c, are always on assets and can include printers, PCs, servers, Internet portals, input devices, site specific electronic devices, and embedded electronic equipment all without limitation.

When enabled as discussed above, the monitoring system 12 can, via the interface 16 and the Ethernet 18, monitor status, availability, or other parameters of the network assets 20i. Information or reports as to such conditions or availability can be provided via a local audio/visual system interface 16-1 or at a wireless user communications device 22 all without limitation.

In yet another embodiment, the monitoring system 12 can monitor conditions on the network 18. Information pertaining to traffic, available bandwidth and the like can also be provided to user(s) via the interface 16-1 or the communications device 22. Such information can be collected at a cloud service site 30 having a plurality of servers, such as 32-1, which communicate via a router 32-1 and a computer network, such as the Internet I.

Alternately, instead of the system 12 carrying out the network and asset monitoring, one or more of the servers 32-1 can remotely monitor the conditions or characteristics of the assets 20i and the network 18.

In summary, asset security can be provided with an Ethernet connected security panel (or equivalent system—either locally or remotely, for instance, via a remote server or on a 'cloud' service) with the addition of services for IT equipment and network monitoring. An embodiment could include a security system with an Ethernet or similar network connection connected to the local IT infrastructure.

Configuration information, such as network parameters or characteristics, parameters of network devices, or network characteristics of interest, could be entered either by the installation engineer, site operator, local IT staff, or other local management or users. Various reporting methods as appropriate to the situation can be provided. For instance, if unarmed, then a local notification to on-site staff to check equipment could be provided. During times when the system is armed, responsible persons could be notified or an alarm receiving center could be notified to take further action.

Such systems could advantageously provide facilities for quick enrollment using phones, tablets, PC computers, or other interfaces. Remote facilities could be contactable with reporting problems. Multiple persons or machines can be involved in processing problems depending upon their type.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims. Further, logic flows depicted in the figures do not require the particular order shown or sequential order to achieve desirable results. Other steps may be provided, steps may be eliminated from the described flows, and other components may be added to or removed from the described embodiments.

The invention claimed is:

1. A security system comprising:
a control panel connected to a plurality of sensors or detectors monitoring a region, wherein the plurality of sensors or detectors includes at least one from a group consisting of motion detectors, glass break detectors, smoke detectors, and thermal detectors, and wherein the control panel includes a programmable element, the programmable element having an interface for communicating with a computer network; and
a plurality of devices coupled to the computer network, wherein the programmable element monitors a status of members of the plurality of devices and provides status related feedback,
wherein the programmable element monitors the status of the members of the plurality of devices by at least one of detecting a presence or an absence of a respective member of the plurality of devices, detecting a status of the respective member of the plurality of devices, or detecting functionality of the respective member of the plurality of devices,
wherein the control panel sends a notification to a person associated with the region when the programmable element detects the absence of the respective member of the plurality of devices from the computer network when the security system is not armed, and
wherein the control panel sends the notification to a different person when the programmable element detects the absence of the respective member of the plurality of devices from the computer network when the security system is armed.

2. The security system as in claim 1 wherein the programmable element comprises a monitoring system.

3. The security system as in claim 2 wherein the interface is continually available to communicate with the computer network.

4. The security system as in claim 3 wherein continually available to communicate comprises communications available during all twenty four hours of a day.

5. The security system as in claim 3 wherein the control panel, via the interface, monitors network conditions.

6. The security system as in claim 5 wherein the control panel monitors the network conditions by determining at least one of device availability, network bandwidth availability, or network availability.

7. The security system as in claim 6 wherein the control panel generates a report for the plurality of devices coupled to the computer network.

8. The security system as in claim 6 wherein the notification includes textual or audible status indicting messages.

9. The security system as in claim 7 wherein the control panel enables selection of one or more devices of the plurality of devices from the report.

10. The security system as in claim 7 wherein the control panel provides at least one of configuring network assets, predicting potential network faults, or providing data and debugging information after a network fault.

11. A method comprising:
providing a control panel of a monitoring system;
connecting the control panel to a plurality of sensors or detectors monitoring a region, wherein the plurality of sensors or detectors includes at least one from a group consisting of motion detectors, glass break detectors, smoke detectors, and thermal detectors, and wherein the control panel includes a monitoring element configured to interface with a communications network;
providing the communications network;
coupling the control panel to the communications network;
the monitoring element monitoring operation of the communications network continuously on a daily basis by at least one of detecting a presence or an absence of a respective member of a plurality of devices, detecting a status of the respective member of the plurality of devices, or detecting functionality of the respective member of the plurality of devices:
sending a notification to a person associated with the region when the monitoring element detects the absence of the respective member of the plurality of devices from the communications network when the monitoring system is not armed;
sending the notification to a different person when the monitoring element detects the absence of the respective member of the plurality of devices from the communications network when the monitoring system is armed; and
the control panel evaluating at least one of network status, network performance, network operation, or characteristics of the plurality of devices on the communications network.

12. The method as in claim 11 wherein, responsive to evaluating at least one of the network status or the characteristics of at least one of the plurality of devices on the communications network, reporting to an available output device.

13. The method as in claim 11 wherein the control panel detects removal of an asset from the communications network and forwards a notice thereof to at least one of a pre-established communications or output device.

\* \* \* \* \*